United States Patent
Wack

[19]

[11] Patent Number: 6,152,278
[45] Date of Patent: Nov. 28, 2000

[54] TORSIONAL VIBRATION DAMPING DEVICE

[75] Inventor: Erwin Wack, Niederwerrn, Germany

[73] Assignee: Mannesmann Sachs AG, Schweinfurt, Germany

[21] Appl. No.: 09/349,434

[22] Filed: Jul. 7, 1999

[30] Foreign Application Priority Data

Jul. 8, 1998 [DE] Germany .......................... 198 30 498

[51] Int. Cl.[7] .............................. F16D 13/64; F16D 3/66
[52] U.S. Cl. .................. 192/213.12; 464/68; 192/213.22
[58] Field of Search .................................... 192/212, 213,
192/213.12, 213.22, 213.31, 214.1, 30 V,
70.17; 464/66, 68

[56] References Cited

U.S. PATENT DOCUMENTS

| | | | |
|---|---|---|---|
| 4,688,666 | 8/1987 | Blond | 192/213.22 |
| 4,700,821 | 10/1987 | Maucher et al. | 192/213.12 |
| 5,909,790 | 6/1999 | Lohaus | 192/213.22 |
| 5,988,343 | 11/1999 | Kleifges et al. | 192/213.12 |

FOREIGN PATENT DOCUMENTS 196 13 574  10/1997  Germany .

*Primary Examiner*—Richard M. Lorence
*Attorney, Agent, or Firm*—Cohen, Pontani, Lieberman & Pavane

[57] ABSTRACT

A torsional vibration damping device for rotating clutch disks which interact with internal combustion engines includes two coaxial cover disks which are held together and are rotatable about an axis of rotation within a fixed angular range relative to an internally located part. A number of torsion springs are circumferentially arranged between the cover disks and the internally located part which may comprise one of an intermediate disk, side disk, spring, drive disk. The cover disks are axially loaded by a spring force in opposing directions and a distance between the cover plate is fixed by axial distance pieces which are connected between the cover plates. The cover disks and the internally located part are arranged on a hub furnished with splines. At least one stop surface is configured on the external splines of the hub so that the internally located part is supported in the axial direction against the stop surface for axially securing the hub.

10 Claims, 3 Drawing Sheets

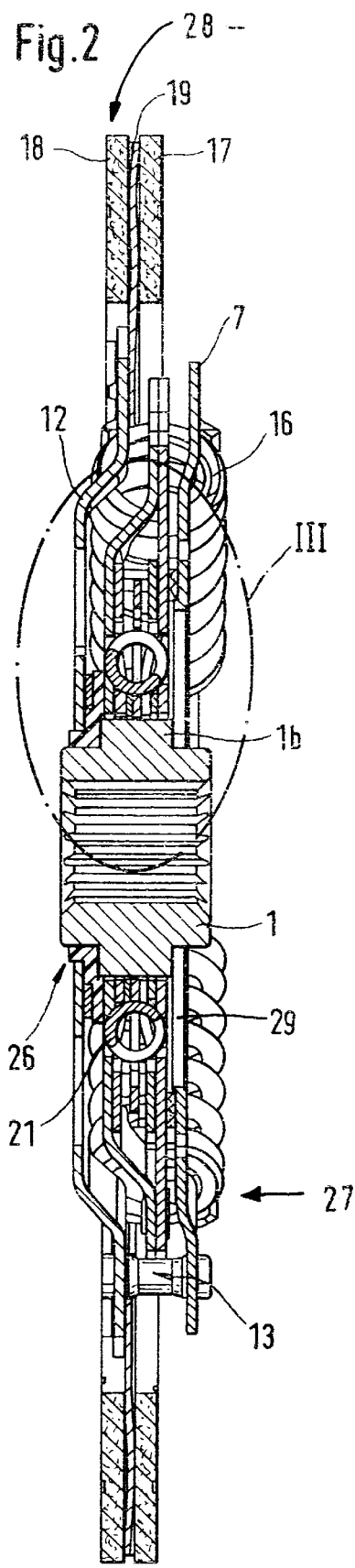
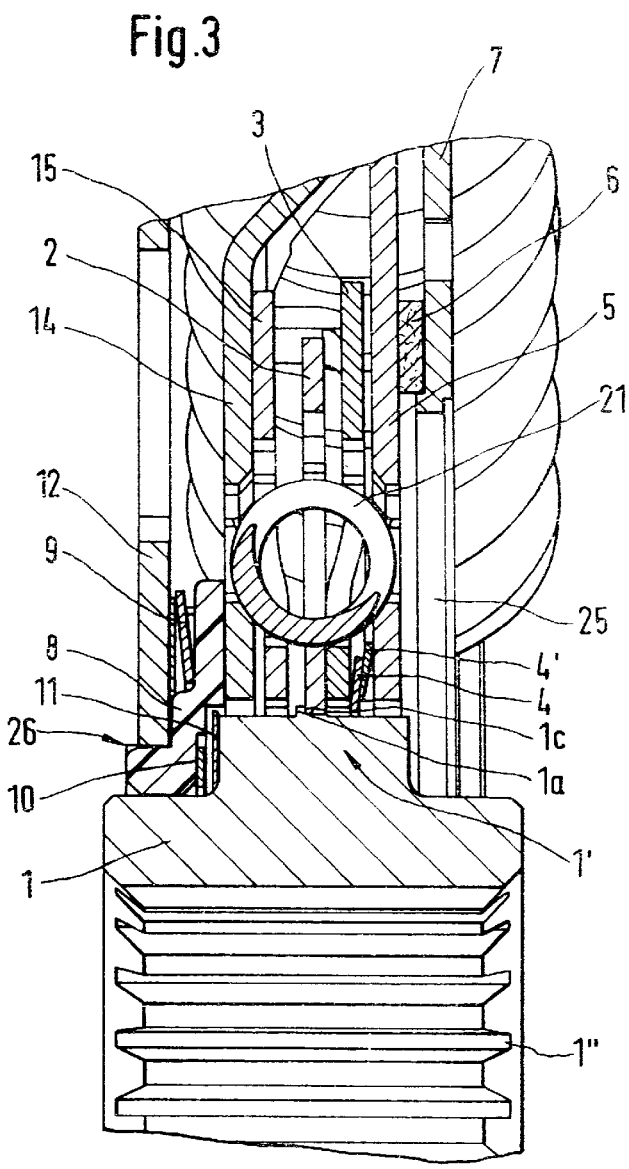

TORSIONAL VIBRATION DAMPING DEVICE

BACKGROUND OF THE INVENTION

1. Field of the Invention

The invention relates to a torsional vibration damping device, in particular for rotating clutch disks which interact with internal combustion engines, having two coaxial cover disks, which can be rotated relative to each other within a fixed angular range relative to an internally located part and which accommodate between them a number of circumferentially directed torsion springs, the cover disks being loaded in the axial direction by a spring force in the opposite direction and being fixed by axial distance pieces, which are connected to a cover plate at each end, the cover disks and the internally located part being arranged on a hub furnished with splines.

2. Description of the Related Art

Vibrations occur in almost all drive trains because of internal or external excitations. Particularly when associated with internal combustion engines, the vibrations caused in principle lead to undesired phenomena. In addition to strength problems, they mainly cause noises which can be noticeable in the gearbox as gearbox clatter and as jolting in the drive train. For this reason, clutch disks and, for example, twin-mass flywheels also are provided with torsional vibration damping devices which essentially operate by a hub disk coaxially arranged between two cover plates being relatively displaceable within a certain angular range against the force of torsion springs.

A prior art torsional damping device is, for example, known from German reference DE 196 13 574 A1. The prior art torsional vibration damper disclosed in this publication has at least three spring stages dimensioned for different torque ranges of the torque to be transmitted between an input component and an output component. Each of the spring stages has a graduated effectiveness in associated ranges of the relative rotational angle between the input component and the output component. Therefore, a three-stage prior art device has low, medium, and high stages respectively corresponding to an initial damper dimensioned for idling operation, a crawling speed damper dimensioned for low speed operation, and an under-load damper dimensioned for under-load operation. Each stage has an initial torque and a final torque. The initial torque of the medium stage is smaller than the final torque of the low stage. Similarly, the initial torque of the high stage is smaller than the final torque of the medium stage. The initial damper and the crawling speed damper are axially moveable via splines in the disk parts guiding the damper springs but are connected to the output part with rotational clearance corresponding to the operating ranges of the damper. Friction devices associated with the individual damper stages can be accommodated between the individual disk parts. The hub, which can be placed on the input shaft of a gearbox, includes splines which act in the radial direction and on which the inner part of the torsional vibration damping device is placed. The two cover plates are placed on the hub to both sides of the splines and are supported against the splines. For this purpose, drive disks are provided coaxially between the two cover plates and the cover plates are supported against the drive disks, a plate spring being provided between one drive disk and one cover plate and a friction ring being provided between the other drive disk and the other cover plate. The cover plates, which extend in the radially inward direction beyond the splines of the hub, are axially supported against the spline teeth of the hub and therefore axially secure the hub.

Corresponding installation space is required to accommodate the plate spring and the friction ring in the axial direction so that the clutch disk, which contains the torsional vibration damping device, has a correspondingly wide structure. Since the plate spring is supported between the cover plate and the drive disk, the frictional relationships present are, in addition, not always reproducible because, as is known, steel-to-steel contact represents a critical friction pairing.

Modern vehicles are increasingly equipped with high-torque engines so that the clutch disk has to have correspondingly larger dimensions for transmitting the corresponding torque. The increase in the use of higher-torque engines permits the engine to perform a larger number of auxiliary functions. Accordingly, there is an associated increase in the amount and variety of equipment installed in vehicles, thereby providing less and less space available for the individual components in the engine compartment of a vehicle. Modern vehicle units therefore demand the most compact possible construction. The known torsional vibration damping device, whose structure is quite wide in the radially inner region, can no longer satisfy the functionality demanded in many cases.

SUMMARY OF THE INVENTION

It is an object of the present invention to provide a new design for a torsional vibration damping device comprising a narrower structure in the axial direction for the same or improved performance.

The object is met by a torsional vibration damping device of the generic type having at least one stop surface arranged on the hub so that an internally located part between two cover plates which are connected via distance pieces and held apart by an axial distance is supported in the axial direction against this stop surface to axially secure the hub. The internally located part may include an intermediate disk, a side disk, a drive disk or a plate spring. Only one of the components is, of course, used for support.

This configuration requires only one of the cover plates to axially secure the hub. Accordingly, one of the cover plates can be cut away in the radially inner region so that the clutch disk has an axially narrower construction for the same functional requirements. Instead of making a narrower clutch plate, the axial space which is not used by the cut away cover plate may be used to increase the torque transmission capability by using larger material thicknesses, for example, to adapt the clutch to the increased engine power where, otherwise, insufficient installation space is available.

In one embodiment, at least one of the hub splines has a shoulder which extends radially outward and on which the stop surface is configured.

Advantageously, at least two drive disks, which engage in the splines of the hub, are arranged coaxially between the two cover disks and a spring is provided between one cover disk and a support ring on which the cover disk is radially supported.

In this configuration, the force path of the main damper friction device takes place by the plate spring being supported on the support ring, one drive disk, the other drive disk, the friction ring, one cover plate, the distance pieces and the other cover plate.

In a further embodiment, two drive disks are arranged between the cover plates and the drive disks and cover plates are relatively rotatable against the force of a first torsion spring to form a main damper. The drive disks are urged against one of the cover plates by the plate spring on the support ring. Two side disks are arranged between the drive disks and are relatively rotatable against the force of a second torsion spring to form an initial damper. An inner disk arranged between the side disks is the internally located part that is held against the stop surface.

A further spring is particularly advantageously provided between the support ring and the splines of the hub.

Because of the support of the further spring on the splines, a force path takes place through the initial damper friction device via the hub, the inner disk, the side disk, a spring between the side disks and the drive disks, the drive disk, the friction ring, one cover plate, the distance pieces, the other cover plate and the support ring.

It is particularly advantageous for the support ring and the cover plate to have a fixed configuration in the rotational direction and to be loose, i.e. axially movable, relative to the spring. Because of the arrangement of the spring between the cover plate and the support ring, the spring is no longer a friction partner. A steel disk can be placed between the spring and the splines to increase the contact area.

Favorable friction pairing is achieved if the friction ring consists of plastic. Instead of providing a friction ring, however, a circumferential shoulder may also be provided which acts in the axial direction, on one drive disk or the cover plate, the frictional connection then taking place via this shoulder. For simplified construction, the cover plates and the drive disks are connected together by the distance pieces.

To use the torsional vibration damping device in a friction clutch, one cover plate is preferably connected to a friction disk having radially outer friction linings.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 shows a section of the clutch disk of FIG. 1 along the line II—II;

FIG. 3 shows an enlarged representation of the area of FIG. 2 indicated by the arrow III.

DETAILED DESCRIPTION OF THE PRESENTLY PREFERRED EMBODIMENTS

The basic construction of a torsional vibration damper is comprehensively described in DE 196 13 574 and reference should be made to its contents.

Figure 1:
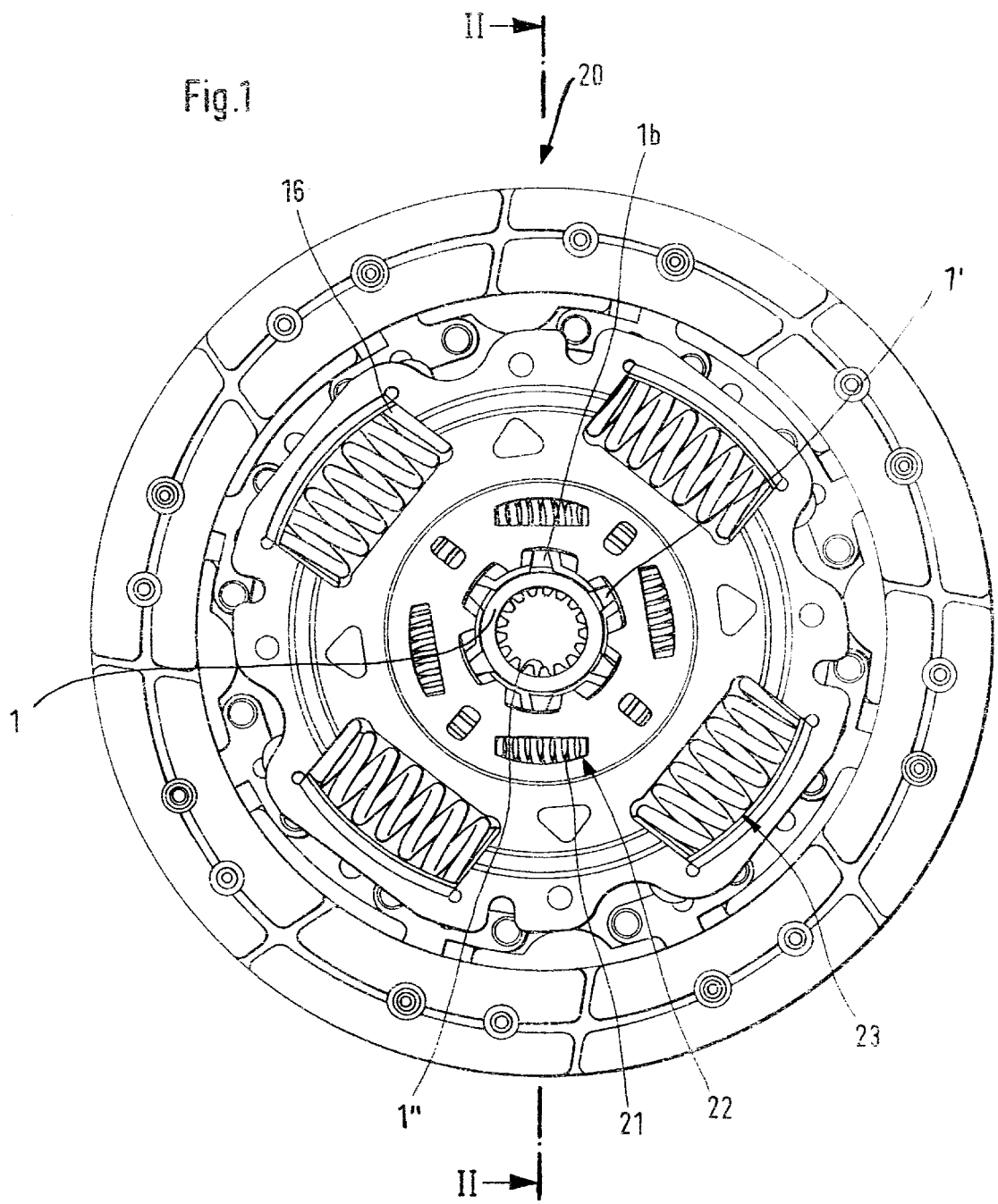
FIG. 1 shows the end view of a clutch disk having a torsion vibration damper according to an embodiment of the present invention.

FIGS. 1–3 show a clutch disk 20 of a motor vehicle friction clutch with a hub 1 which can be centrally placed on an input shaft of a gearbox (the input shaft is not shown) so that the hub is rotationally fixed and axially moveable on the input shaft via internal splines 1". Torque is transmitted to the clutch disk 20 and introduced into the torsional vibration damping device by a friction disk 28 with lining springs 19 arranged between friction linings 17, 18. A main damper 27 having circumferentially arranged torsion springs 16 and an idling damper 29 (initial damper) likewise having circumferentially arranged torsion springs 21 and located radially further inward are provided for torsional damping. The hub 1 includes radially external splines 1' which are formed by individual external splines 1b. An axial stop surface 1c is configured on the splines 1b. Cover plates 7, 12 are provided on each side of the splines 1' and these cover plates 7, 12 are connected together in a rotationally fixed manner by distance pieces 13.

Figure 4:
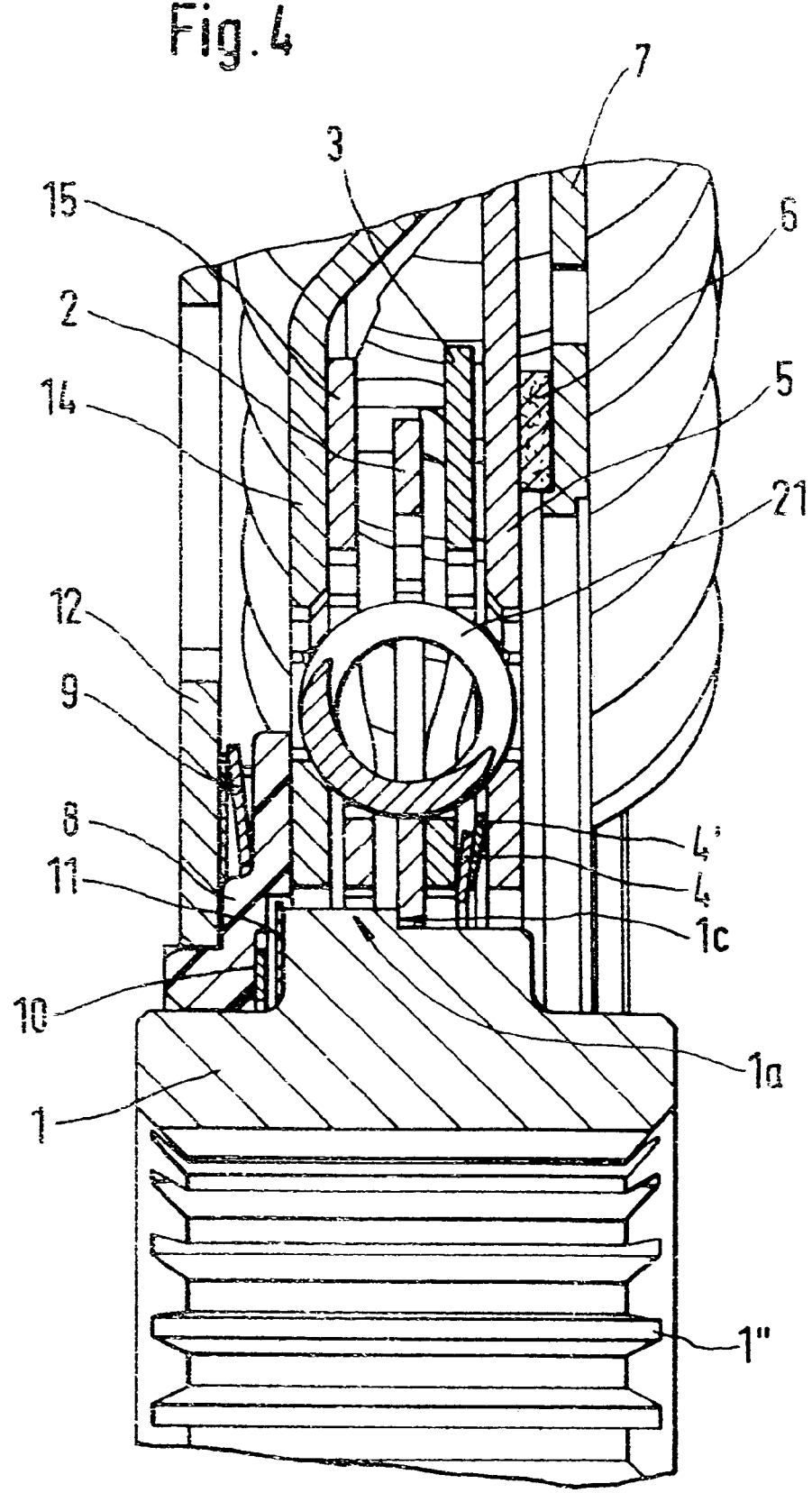
FIG. 4 shows the same area as FIG. 3 of another embodiment of a clutch disk according to the present invention.

Two drive disks 5, 14, two side disks 3, 15 and an inner part 2 are all arranged coaxially between the cover plates 7, 12. The inner part 2 arranged coaxially between the side disks 3, 15 forms an intermediate disk. The torsion springs 21 of the initial damper are arranged in windows 22 provided in the drive disks 5, 14 and in the side disks 3, 5 and the intermediate disk 2. The cover plates 7, 12 likewise have windows 23 for accommodating the torsional springs 16. The external splines 1b of the hub 1 have shoulders or humps 1a which protrude radially outward and form an axial stop surface for the radially inner part of the intermediate disk 2. In an alternative embodiment, as is shown in FIG. 4, the external splines 1b may have a stepped configuration instead of the shoulders or humps 1a.

A support ring 8 is arranged on the hub 1 for supporting the cover plate 12 via splines 26 on the support ring 8 so that the cover plate 12 is rotationally fixed and axially movably arranged on the support ring 8. The external splines 1' support the support ring 8 via an annular spring 10 and a steel disk 11. A spring 9, which is configured as a plate spring and applies an axially directed force, is provided between the support ring 8 and the cover plate 12. Each of the drive disks 5, 14, the side disks 3, 15 and the intermediate disk 2 are connected with some clearance play via internal splines, to the splines 1' of the hub 1 so that they rotate with the latter. A plate spring 4 with individual spring tongues 4' protruding axially and radially outward is provided between the drive disk 5 and the side disk 3. The side disk 3 presses the intermediate disk 2 axially against the hump 1a of the splines 1b under the urgency of this plate spring 4. A friction ring 6 made of a plastic material, and whose radius of action is larger than the radius of action of the springs 4, 9, is provided between the drive disk 5 and the cover plate 7. The cover plate 7 overlaps the friction disk 6 for a short portion radially inward and then terminates so that a free space 25 is left in the radial direction between the hub 1 and the cover plate 7. The hub 1 is axially secured by the intermediate disk 2 which is in contact with the humps 1a so that a free axial space is created by the free annular space 25 retained between the cover plate 7 and the hub 1. The free space 25 extends in the radial direction beyond the torsion springs 21 of the initial damper.

Because the plate spring 9 required for the main damper 27 is supported on the cover plate 12 and the support ring 8, the force path of the main damper friction device takes place via the support ring 8, the drive disk 14, the drive disk 5, the friction ring 6, the cover plate 7, the distance pieces 13 and the cover plate 12.

The force path in the friction device of the initial damper 29 takes place by the annular spring 10, which is supported on the disk 11, the hub 1, the intermediate disk 2, the side disk 3, the plate spring 4, the drive disk 5, the friction ring 6, the cover plate 7, the distance pieces 13, the cover plate 12 and the support ring 8.

The invention is not limited by the embodiments described above which are presented as examples only but can be modified in various ways within the scope of protection defined by the appended patent claims.

I claim:

1. A torsional vibration damping device, comprising:

a hub having external splines;

first and second cover plates connected together and held apart at an axial distance such that said first cover plate is fixed with respect to rotation relative to said second cover plate, wherein one of said first and second cover plates is mounted on said hub such that said first and second cover plates are rotatable relative to said hub about an axis of rotation and the other one of said first and second cover plates is operatively arranged such that a radial free space is defined between the other one of said first and second cover plates and said hub, said first and second cover plates being axially loaded in opposing directions via a spring force;

an internally located part arranged between said first and second cover plates and rotatable within a fixed angular range relative to said first and second cover plates;

a torsion spring circumferentially arranged between said internally located part and said first and second cover plates so that said internally located part rotates relative to said first and second cover plates against an urgency of said torsion spring, said first and second cover plates, said internally located part and said torsion spring comprising a main damper;

and at least one stop surface arranged on said external splines so that said internally located part is supported against said stop surface for axially securing said hub via said spring force.

2. The torsional vibration damping device of claim 1, wherein said stop surface is arranged on a radial outward extending shoulder on at least one spline of said external splines.

3. The torsional vibration damping device of claim 1, wherein said internally located part comprises at least first and second drive disks engaging and external splines of said hub and coaxially arranged between said first and second cover disks and said torsional vibration damping device comprising a support ring arranged on said hub and a first spring arranged between one of said first and second cover disks and said support ring.

4. The torsional vibration damping device of claim 3, further comprising a second spring arranged between said support ring and said external splines of said hub.

5. The torsional vibration damping device of claim 4, further comprising a friction ring arranged between said internally located part and the other of said first and second cover plates, wherein said friction ring comprises a plastic material.

6. The torsional vibration damping device of claim 3, wherein said first and second cover plates and said first and second drive disks are connected together by distance pieces.

7. The torsional vibration damping device of claim 1, wherein one of said first and second cover plates further comprises a friction disk having radially outer arranged friction linings.

8. The torsional vibration damping device of claim 3, further comprising splines arranged on said support ring for rotationally fixing said one of said first and second cover plates to said support ring, and wherein said support ring and said one of said first and second cover plates are implemented as axially movable relative to said first spring.

9. The torsional vibration damping device of claim 1, wherein said internally located part comprises first and second drive disks arranged on said hub between said first and second cover plates, first and second side disks arranged on said hub between said first and second drive disks, an idling torsion spring arranged between said drive disks and said side disks such that said side disks are rotatable relative to said drive disks against a spring force of said idling torsion spring, an internal disk arranged between said first and second side disks and supported against said stop surface for axially securing said hub, said drive disks, said side disks and said idling torsion spring comprising an idling damping device, wherein said radial free space extends radially beyond said idling torsion spring.

10. The torsional vibration damping device of claim 1, wherein said internally located part comprises first and second drive disks arranged on said hub between said first and second cover plates, first and second side disks arranged on said hub between said first and second drive disks, an idling torsion spring arranged between said drive disks and said side disks such that said side disks are rotatable relative to said drive disks against a spring force of said idling torsion spring, an internal disk arranged between said first and second side disks and supported against said stop surface for axially securing said hub, said drive disks, said side disks and said idling torsion spring comprising an idling damping device.

* * * * *